(12) United States Patent
Valta et al.

(10) Patent No.: US 7,662,953 B2
(45) Date of Patent: Feb. 16, 2010

(54) METHOD FOR MANUFACTURING CELLULOSE CARBAMATE

(75) Inventors: Kyösti Valta, Tampere (FI); Eino Sivonen, Ruutana (FI)

(73) Assignee: Valtion Teknillinen Tutkimuskeskus, Espoo (FI)

( * ) Notice: Subject to any disclaimer, the term of this patent is extended or adjusted under 35 U.S.C. 154(b) by 0 days.

(21) Appl. No.: 10/501,950

(22) PCT Filed: Jan. 29, 2003

(86) PCT No.: PCT/FI03/00073

§ 371 (c)(1),
(2), (4) Date: Jul. 21, 2004

(87) PCT Pub. No.: WO03/064476

PCT Pub. Date: Aug. 7, 2003

(65) Prior Publication Data

US 2005/0054848 A1  Mar. 10, 2005

(30) Foreign Application Priority Data

Jan. 29, 2002  (FI) ................... 20020163
Jan. 8, 2003  (FI) ................... 20030027

(51) Int. Cl.
*C08B 15/06* (2006.01)
*C08B 37/00* (2006.01)
*C07H 1/00* (2006.01)

(52) U.S. Cl. ............... 536/30; 536/53; 536/124
(58) Field of Classification Search .......... 536/30, 536/53, 124
See application file for complete search history.

(56) References Cited

U.S. PATENT DOCUMENTS

| 2,134,825 A | 11/1938 | Hill et al. |
| 4,404,369 A | 9/1983 | Huttunen et al. |
| 4,530,999 A | 7/1985 | Selin et al. |
| 4,567,255 A | 1/1986 | Eklund et al. |
| 4,997,934 A | 3/1991 | Rahman |
| 5,378,827 A * | 1/1995 | Keunecke et al. ......... 536/30 |

FOREIGN PATENT DOCUMENTS

| DE | 19835688 A1 | 2/2000 |
| EP | 0402606 A2 | 12/1990 |
| EP | 0402707 A1 | 12/1990 |
| FI | 61033 | 5/1982 |
| JP | 2001-172302 | 6/2001 |
| WO | WO 00/08060 | 2/2000 |
| WO | WO 03/054023 | 7/2003 |

OTHER PUBLICATIONS

D Klemm et al.; "Comprehensive Cellulose Chemistry"; Wiley-VCH, 1998; pp. 161-164.
Communication issued by European Patent Office in counterpart European patent application 03700823.2, Feb. 2009.
Notification of Reason for Refusal issued by Japanese patent office in counterpart application 2003-564096 Jul. 21, 2009.

* cited by examiner

*Primary Examiner*—Shaojia Anna Jiang
*Assistant Examiner*—Everett White
(74) *Attorney, Agent, or Firm*—Venable LLP; Eric J. Franklin

(57) ABSTRACT

The invention relates to a method for manufacturing cellulose carbamate. In the method, an auxiliary agent and urea in solution form and possibly in solid form are absorbed into cellulose, and a reaction between cellulose and urea is carried out in a mixture containing cellulose, a liquid, the auxiliary agent, and urea The absorption of the auxiliary agent and urea into cellulose, and the reaction between the cellulose and the auxiliary agent at least partly are carried out in a working device. According to the invention, it is possible to manufacture cellulose carbamate without ammonia, organic solvents or other auxiliary agents, by using only a small quantity of water as a medium.

31 Claims, 1 Drawing Sheet

METHOD FOR MANUFACTURING CELLULOSE CARBAMATE

CROSS-REFERENCE TO RELATED APPLICATIONS

This application claims priority to Finnish patent applications 20020163 filed 29 Jan. 2002 and 20030027 filed 8 Jan. 2003 and is the national phase under 35 U.S.C. § 371 of PCT/FI03/00073.

FIELD OF THE INVENTION

The invention relates to a method for manufacturing cellulose carbamate, in which method cellulose is allowed to react with an auxiliary agent and urea.

Carbamate cellulose can be used further as an alkaline solution, in the same way as viscose cellulose, for example in the manufacture of fibres and films and for reinforcing paper products, by regenerating the solution back to cellulose fibres, as is done in a viscose process. Another possibility is to use it only by precipitating as carbamate fibres or films.

TECHNICAL BACKGROUND

The manufacture of fibres and films from cellulose by the viscose process has been known for more than a hundred years. Even today, almost all cellulose-based fibres are manufactured by the viscose method. It is a known method, by which various properties of the final product are achieved by varying the material and process parameters. However, the viscose method involves significant drawbacks: the preparation of the spinning solution includes laborious work stages, the carbon disulphide used for the dissolution is toxic, inflammable and combustible, and it is difficult to recover. Furthermore, some of the carbon disulphide is decomposed to hydrogen sulphide, which is also toxic and explosive. In addition, the viscose solution is an unstable product, whereby it cannot be stored as an intermediate product, but all the steps of the manufacture must be taken without a delay from the beginning to the end, keeping the mass at a low temperature.

Several attempts are known to replace the viscose method with a more ecological method. The most promising one has been the conversion of cellulose to cellulose carbamate by means of urea (see, for example, D. Klemm et al., Comprehensive Cellulose Chemistry, Wiley-VCH 1998). In spite of its obvious advantages and several known attempts, this method has, however, remained on the laboratory scale. Reasons have included problems in the homogeneity of the product, the recovery and residues of organic auxiliary agents (e.g. hydrocarbon) and/or solvents (normally ammonia) used, the properties of the final products (primarily fibres), which have been not more than satisfactory, and the operation costs of the methods developed.

Known attempts to provide a method for manufacturing cellulose carbamate have been based on the soaking of pulp sheets in an alkaline solution (mercerization), which has, in some cases, included an addition of ammonia and/or other solvents or accelerators. After the mercerization, the pulp, partly dried by compressing, is treated in a urea solution, which may include an addition of an alkalizing agent, normally also ammonia and possible solvents or salts. Finally, the reaction between urea and the pulp is carried out in an oven at a temperature of about 130° C. The methods have required the best viscose cellulose whose DP level has been reduced, for example, by long-term curing in a mercerization solution or by irradiation in advance. Examples of the above-described processes are presented in patents FI 61033, EP 0 402 606 and WO 00/08060.

One of the first attempts to manufacture cellulose carbamate is presented in U.S. Pat. No. 2,134,825. It uses the aqueous solution of urea and sodium hydroxide, with which the pulp sheets are first impregnated. After the impregnation, settling and compression, the mass is dried and heated in the oven to achieve a reaction between the cellulose and urea. The patent presents a number of chemicals to improve the absorption and to reduce the gelling tendency of the solution. This patent also presents the use of hydrogen peroxide for the purpose of reducing the viscosity of the solution. However, pulps manufactured on the basis of the patent have been only partly soluble in such a way that a large quantity of unreacted fibres is left in the solution, jamming the spinning nozzle. This is probably due to the unevenness of the substitution.

In all known methods for manufacturing cellulose carbamate, an alkaline solution (aqueous sodium hydroxide) is used for activating (swelling) the pulp, as in conventional mercerization of pulp. An exception to this, U.S. Pat. No. 2,134,825 experiments the use of hydrogen peroxide with and without sodium hydroxide to activate the pulp for the purpose of reducing the viscosity of the solution.

Cellulose carbamate is alkali soluble at a substitution degree of 0.2 to 0.3. The formation of cellulose carbamate begins when the mixture of cellulose and urea is heated to a temperature exceeding the melting point of the latter (133° C.). When heated, urea is decomposed to isocyanic acid and ammonia according to the following reaction formula:

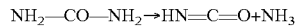

Isocyanic acid is very reactive and it forms carbamates with the hydroxy groups of cellulose as follows:

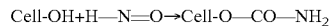

Possible side reactions include the reaction of urea and isocyanic acid to a biuret, or the formation of cyanuric acid and other polymerization products of isocyanic acid.

GENERAL DESCRIPTION OF THE INVENTION

The purpose of the invention is to start from the starting points of said U.S. Pat. No. 2,134,825 but to apply a new processing technique to eliminate the problems involved in the quality of the product and to provide several parameters for the control of the properties of the final product. The aim of the invention is also to present a method by which it is possible to prepare solutions and final products of high quality also when starting from ordinary and inexpensive wood pulp. To achieve these aims, the invention is characterized in what will be presented in claim 1. In the method according to the invention, cellulose is allowed to react with the auxiliary agent and urea at a high dry matter content and without an organic solvent or other auxiliary agents. In the method, the penetration of the chemicals into the fibre, the homogenization of the pulp, the reduction of the crystallinity of the pulp, the DP adjustment of the product, and partly also the reaction are caused by mechanical working. The reaction is completed in an oven. Some preferred embodiments of the invention will be described in the other claims.

The auxiliary agent used in the reaction is an alkalization agent, such as an alkali metal hydroxide, or hydrogen peroxide. When hydrogen peroxide is used, it can replace the alkali metal hydroxide partly or entirely in the pretreatment of the pulp before the addition of liquid urea.

In the method according to the invention, the penetration of the auxiliary agent and urea in the cellulose can be enhanced in a mechanical working device. Under mechanical working, the fibre bundles are disintegrated, the pores in the fibre are opened and the liquid penetrates into the fibre. The auxiliary agent activates the fibre and contributes to the penetration of urea. The mechanical working is also used for homogenization of the mixture of pulp and chemicals. The mechanical working device is particularly a sieve press, a roll mixer, or an extruder. The reaction is carried out in a mixture containing a liquid. Its content in the mixture is, for example, less than 40%, advantageously less than 30%, preferably less than 25%, and most preferably less than 22%. For example, more than 50%, advantageously more than 70%, preferably more than 90%, and most preferably all of the liquid is water. The cellulose used can be, for example, wood pulp, dissolving pulp, or linters. The cellulose used as the basic material is preferably fine ground cellulose (particle size e.g. less than 0.7 mm). The particle size is indicated as the mesh size of the sieve which the particles pass in the grinding.

The processing device is a mechanical working device, in which the mixture is compressed, rubbed and stretched several times. In particular, the working device may be a sieve press, a continuously operating roll mixer, or an extruder. Thanks to the thermal energy produced during the mechanical working and/or introduced in the system from the outside, the temperature of the mixture can be raised to such a level that the actual reaction can also be started and performed, at least partly, already in the mechanical working device. It is typical of the mechanical working method that the cellulose fibres, together with the other ingredients in the mixture, must go several times through the same working event, when the migration of a single fibre is examined.

The alkalization agent used as the auxiliary agent may be, particularly, an alkali metal hydroxide, such as sodium hydroxide. The alkalization agent can be added in the reaction mixture, for example, in an aqueous solution and/or in the dry state. The alkalization agent can be added before urea, or partly or wholly simultaneously with urea. The urea can be added in dry state and/or in an aqueous solution. The feeds of liquid substances can be performed in an atomized form in a pre-mixing device, for example a fluidized bed mixer, followed by the reaction in the mechanical working device. The liquid, the urea and the auxiliary agent are dosed into the cellulose in such a proportion that the liquid content of the mixture is raised to the aforementioned relatively low starting level at which the absorption takes place. A part of the urea can also be added in solid form.

Surprisingly, the alkali metal hydroxide, such as sodium hydroxide, can be replaced wholly or entirely by hydrogen peroxide ($H_2O_2$) in the pretreatment of the pulp before the addition of liquid urea. The manufacture of cellulose carbamate is not successful with the urea solution alone. In particular, it has been surprising that when $H_2O_2$ is used, the optimal quantity of urea is lower than in a corresponding process based on NaOH. Furthermore, the quantity of hydrogen peroxide in relation to the pulp is smaller than the corresponding quantity of NaOH. From what has been said above, it follows that the efficiency is higher, the consumption of chemicals is lower, and the quantity of material to be circulated in the wash is smaller. In combination, these will compensate for the higher price of $H_2O_2$ so that the total costs of the manufacturing process will remain lower than in a corresponding process based on NaOH. NMR and IR analyses of cellulose carbamate made by the method show that cellulose carbamate is the same as in the case of pulp treated with NaOH. Hydrogen peroxide works, as in known cellulose processing techniques (primarily bleaching), by reducing the DP level of the pulp. The DP level is now controlled in two ways: on one hand, by the quantity of $H_2O_2$ and, on the other hand, by the degree of mechanical working.

In the method according to the invention, in which the alkalizing agent is wholly replaced with hydrogen peroxide, the penetration of chemicals into the fibres can be enhanced in the mechanical working device as in the case of sodium hydroxide. The solutions thus obtained are of at least as high quality as in the case of sodium hydroxide. Surprisingly, we have found that the pulp activated by means of the peroxide can, after the dosage of the chemicals, be directly introduced in the reaction oven, without mechanical working, still resulting in applicable solutions. Solutions prepared by this method can be used in applications which allow a small quantity of remaining fibres.

The hydrogen peroxide can be added before the urea, partly or wholly simultaneously with the urea. It can be added in the form of an aqueous solution. The dosages of liquid substances into the cellulose can be provided in atomized form in a mixing device, for example a fluidized bed mixer, followed, if necessary, by mechanical working and the partial reaction in the mechanical working device. The liquid content achieved in the dosage is low in the same way as when an alkalizing agent is used; that is, the liquid content in the mixture is less than 40%, advantageously less than 30%, preferably less than 25%, and most preferably less than 22%. For example, more than 50%, advantageously more than 70%, preferably more than 90%, and most preferably all of the liquid is water. The cellulose used can be, for example, wood cellulose, dissolving pulp, or cotton linters. The cellulose used as the starting material is preferably fine ground cellulose (particle size e.g. less than 0.7 mm). The content of hydrogen peroxide in relation to the dry weight of the cellulose is normally at least 1%, preferably 1 to 12%.

In one aspect of the invention, the mechanical working device is a sieve press or a roll mixer, which are reliable in use and which are not jammed as easily as extruders.

In a sieve press, the pulp is pressed through channels. Normally, rotating rolls are used for the pressing. The pressing efficiency depends on the diameter and length of the channels, the number of channels per area, as well as the press load on the pulp over the channel matrix. There is a variety of such devices. The channel matrix may be rotating, placed underneath a press roll mounted on a fixed axle. There may also be several rolls. The press rolls may also be inside a cylindrical rotating matrix. If necessary, the matrix or the rolls can be heated or cooled.

A roll mixer comprises two rolls rotating opposite to each other. The pulp to be mixed is fed into a nip formed by the rolls, in which the pulp adheres as a mat on the surface of one roll and is compressed several times in the nip. In a continuously operating roll mixer, the pulp is fed into one end of the nip, and the mat is conveyed to the opposite end of the nip. To facilitate the conveying, the rolls may be provided with shallow screw thread grooves or low screw thread ridges, the rolls may tilted towards the outlet end, or there may be a speed difference between the rolls. The surface material of the rolls is selected so that the pulp adheres as a uniform mat to the desired roll. If necessary, one or both of the rolls can be heated or cooled.

In one aspect of the invention, when mechanical working is used, the pulp is run several times, for example 2 to 10 times, such as 4 to 6 times, through the mechanical working device. At the sieve press, this may involve the change of the sieve plate after a few compression times, or the use of two different presses one after the other.

In an aspect of the invention, the total processing time is less than 30 min, advantageously less than 20 min, preferably less than 15 min, and most preferably less than 10 min. The pre-mixing time is for example less than 30 min, preferably less than 15 min, and most preferably less than 10 min. The drying and reaction time will depend on the temperature in that the time can be reduced at a higher temperature.

In the method according to the invention, for example ammonia, organic solvents or other auxiliary agents will not be needed. Water, needed as the medium is supplied together with the chemicals to be added in the system. Because of the high dry matter content, the mixture can, after the mechanical working, be transferred directly to the reaction step to an oven or the like to elevated temperature, without drying in an intermediate step.

When hydrogen peroxide is used as the auxiliary agent, mechanical working is not necessarily needed, depending on the use. In this case it is essential that the liquid content (water content) of the reaction mixture is low, as mentioned above. After absorption for a given time at a low liquid content, the mixture which has not been worked mechanically, is transferred to the reaction step into the oven.

DESCRIPTION OF THE DRAWINGS

In the following, some embodiments of the invention will be described in detail. The appended drawings are part of the description. In the drawings.

DETAILED DESCRIPTION OF SOME EMBODIMENTS OF THE INVENTION

Figure 1:
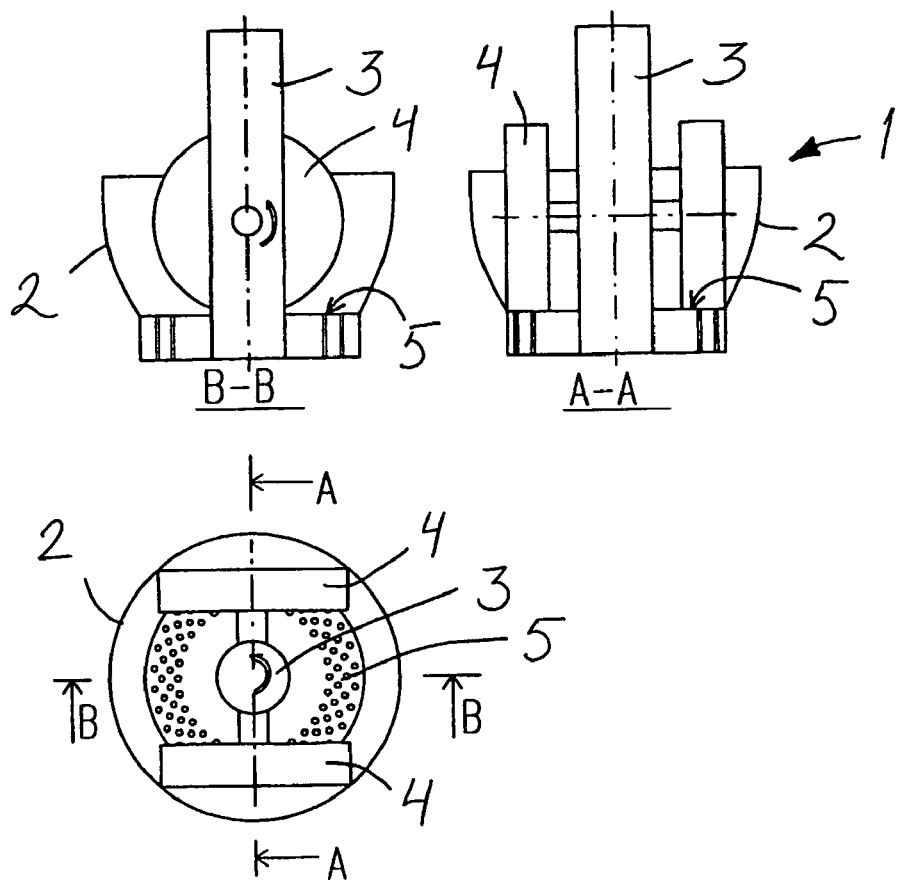
FIG. 1 shows, in three cross-sectional views, a sieve press in which the reaction according to the invention can be carried out.

In FIG. 1, a sieve press 1 is provided with a drive shaft 3 placed in a stationary vat 2, a horizontal roll axle being mounted on the shaft and rolls 4 being journalled at the ends of the axle. The bottom of the vat is a sieve plate matrix 5, against which the rolls roll when the drive shaft is rotated. The sieve plate matrix is exchangeable. The side walls of the vat and the matrix form a jacket, through which a heat transfer medium can be led. The rolls can also be equipped with heat transfer devices. The rotating rolls press the pulp supplied into the vat through openings in the sieve plate matrix, whereupon the pulp is compressed into pellets. The pressing efficiency depends on the diameter and length of the channels, the number of channels per area, as well as the press load caused by the rolls on the pulp over the matrix.

Figure 2:
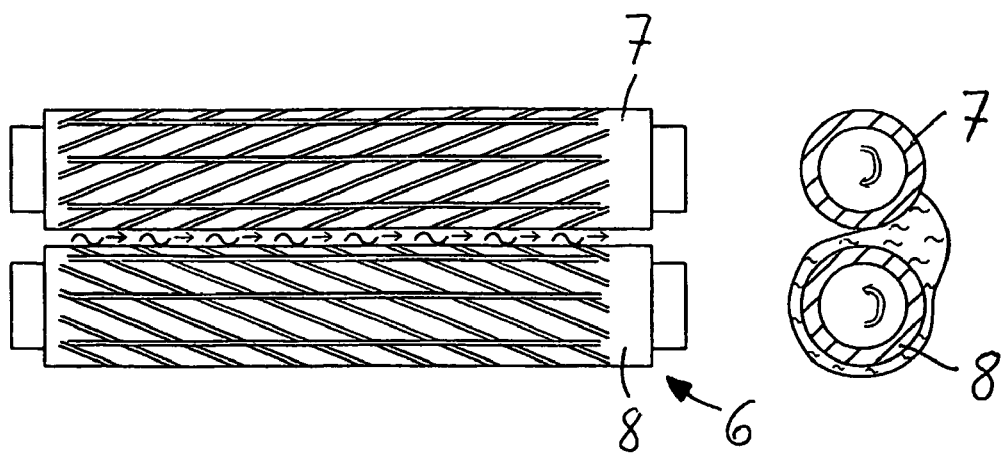
FIG. 2 shows, in top and side views, a continuously operating roll mixer in which the reaction according to the invention can be carried out.

The roll mixer 6 shown in FIG. 2 comprises two adjacent rolls rotating in opposite directions: a rubbing roller 7 and a pulp roll 8. The material to be pressed adheres to the surface of the pulp roll, being pressed several times in the nip between the rolls, when the rolls are rotated. The rolls are provided with a screw thread grooving for conveying the material to the other end of the nip. The rolls are equipped with heat transfer devices.

In the following examples, various formulations will be used, and a sieve press will be used as the mechanical working method. It will be common to them all that the chemical dosage is made in batches in a fluidized bed mixer. Depending on the chemicals used during and after the dosage, cooling of the pulp may be needed. Also the working devices are coolable or heatable. The sieve plate press is used for homogenizing the pulp and partly for the reaction by running the pulp several times through the press. This is optimized in relation to the quality aimed at (DP, viscosity, filtration residue).

The quality of the process was evaluated by analyzing the alkali-dissolved carbamate cellulose solution by various methods. Some or all of the following methods will be used here according to the case:

1) Degree of polymerization (DP), which gives an estimate of the mechanical and physical properties of the final product (fibres and films) and which is used as a measure for the quality control in the process. The higher the DP level, the more diluted solutions must be used, if the level of viscosity is limited because of application. The optimal DP level and cellulose content must be found separately in each case. Normally, in the manufacture of viscose fibres, the desired DP level is in the range from 200 to 400. For determining the DP, the method according to the standard SCAN-CM 15:99 is used here. In the method, the viscosity ratio is determined to evaluate the DP on the empirical basis (see e.g. J. Gullichsen, H. Paulapuro, Papermaking Science and Technology, Fapet 2000).

2) Clogging indicator Kw (filtration residue) represents the content of insoluble matter in the solution. This is a common measurement for the quality of a solution, and particularly a measure for the clogging tendency of a fibre nozzle. This analysis is made according to the article by H. Sihtola in Paperi ja puu 44 (1962):5, pp. 295-300. It should be noted that the result will, to some extent, depend on the filter cloth type used. The filter mentioned in the article is no longer available, but a corresponding type has been sought here. After a number of tests, we decided to use the paper-based filter type 520B manufactured by Schleicher & Schnell. Normally, a solution with Kw<2000 is considered good in view of fibre applications.

3) The nitrogen content of the solution indicates the degree of substitution. The degree of substitution refers to the average number of substituents attached to one glucose unit. In this context, the Kjeltek device by VTT BEL (supplied by Tecator) is used for determining the nitrogen content. If the carbamate cellulose is not regenerated but only precipitated, the nitrogen is also left in the final product. The obtained product is thus different in its properties, for example biodegradability, than viscose-based products.

4) The degree of purity of the carbamate pulp is analyzed by washing and by measuring the content of residues.

5) The viscosity of the solution is measured by the conventional ball method (see said article by Sihtola) and/or by a Brookfield viscometer. The control of viscosity is essential in view of the processing (nozzle flows and pulp transfer in general), as was already mentioned in connection with the DP analysis. Furthermore, the viscosity has an influence on the operation of the dissolving mixer: the higher the viscosity formed in the solution, the higher the mixer efficiency and/or the better the mixer configuration needed to achieve a good dispersion.

6) The fibre residue of the solution is also evaluated microscopically by using a subjective scale from 1 to 5 in such a way that 1: clear solution with no fibres and 5: turbid solution containing a lot of whole fibres, fibre bundles and/or gel-like structures.

The percentages given in this application are weight percentages, unless otherwise indicated.

EXAMPLES 1 TO 15

In Examples 1 to 7, three different pulp types were used with various NaOH quantities and urea contents. The mechanical working was carried out by means of a sieve plate press with several runs through.

The dosage of chemicals is carried out in a fluidized bed type mixer in such a way that during the dosage, the pulp is moving all the time and the chemicals are added in atomized form to achieve as high a homogeneity as possible. Both of the chemicals (alkalizing agent and urea) are dozed separately one after the other. The urea is dosed in an aqueous solution in such a way that the total moisture content remains as shown in the table. NaOH is dosed in an aqueous solution. The cellulose is finely ground wood pulp.

dissolved in an aqueous NaOH solution in such a way that the final concentration of the solution will be 9.6 wt-% of NaOH. The properties of the cellulose carbamates thus obtained are presented in table 2 below.

TABLE 2

Properties of cellulose carbamates obtained by the manufacturing methods of examples 1 to 7.

| Test No. | Degree of polymerization DP | Clogging indicator Kw | Viscosity of the solution (cP)/ concentration % | Ball viscosity s/CCA concentration | Nitrogen N % | Degree of purity % | Quality of solution |
|---|---|---|---|---|---|---|---|
| 1 | 220 |  | 2740/6 | 52/6 | 1.96 | 63.2 | 2 |
| 2 | 600 |  |  |  | 0.15 | 76.9 | 5 |
| 3 | 100 |  | 596/5.5 |  | 2.52 | 61.2 | 3 |
| 4 | 250 | 37500 | 5500/6 | 36/9 | 1.13 | 76.4 | 4 |
| 5 | 69 | 934 | 265/6 | 102/10 | 3.16 | 67.5 | 1 |
| 6 | 240 | 2177 |  | 60/7 |  | 73.0 | 1 |
| 7 | 315 | 1945 |  | 38/5 |  | 73.0 | 1 |

The sieve plate working is carried out with a continuously operating sieve plate device, in which the feeding is performed by a double-screw feeder. The feed rate is selected so that no material will be accumulated in front, on top or on the sides of the wheels, but all the fed material is pressed through the holes in the matrix. On the outflow side of the matrix, the material is cut with a cutter to granules. The jacket can be cooled by an external water circulation.

Process and Running Parameters for Sieve Plate Pressing:

| | |
|---|---|
| Hole diameter and length D/H mm | 3/40 |
| Number of holes | 120 |
| Inner/outer diameter of hole distribution d/D mm | 160/190 |
| Number and diameter of press rolls D1 mm | 2/150 |
| Rotational speed of roll rpm | 10-20 |
| Temperature set for cooling the jacket T° C. | −5 . . . +100 |
| Number of times to run through | 1-20 |

The following table 1 includes the pulp types of different test runs (DP of starting pulp), dosage quantities (chemicals in relation to the dry weight of pulp), the calculated total water content, and the number of times to run through the sieve plate working.

TABLE 1

The manufacture of cellulose carbamate with an alkali metal hydroxide as the auxiliary agent.

| Test No. | Pulp type | NaOH % on pulp | Urea % on pulp | Water % in total mass | No. of working cycles |
|---|---|---|---|---|---|
| 1 | Birch pulp, DP 950 | 7 | 62 | 21.2 | 14 |
| 2 | Birch pulp, DP 950 | 7 | 22 | 22.2 | 8 |
| 3 | Birch pulp, DP 950 | 7 | 70 | 20.4 | 14 |
| 4 | Eucalyptus dissolving pulp, DP 600 | 7 | 42 | 18.1 | 4 |
| 5 | Eucalyptus dissolving pulp, DP 600 | 11 | 50 | 20.7 | 7 |
| 6 | Eucalyptus dissolving pulp, DP 600 | 5 | 70 | 22.4 | 14 |
| 7 | Softwood dissolving pulp, DP 1400 | 7 | 70 | 22.5 | 10 |

After the processing, the reaction is completed in an oven, in which T=140° C. and the retention time t=4 h, followed by refining with a disc refiner. After the refining, the powder is In the examples 8 to 15, the same dissolving pulp type is always used, and formulations based on NaOH and $H_2O_2$ are compared with each other. Various quantities of NaOH and $H_2O_2$ and urea contents are used. The mechanical working is performed with a sieve plate press whose running parameters are the same as in the examples 1 to 7 but in which 10 run-through times are used.

The dosage of chemicals is carried out in a batch type fluidized bed mixer in such a way that during the dosage, the pulp is moving all the time and the chemicals are added in atomized form to achieve as high a homogeneity as possible. Both chemicals are dosed one after the other, first $H_2O_2$ or NaOH and then urea, in aqueous solutions of different concentrations to achieve the total moisture content given in the table. The cellulose is finely ground to the mesh size of 0.3 mm.

The following table 3 shows the formulations for the different test runs. The pulp type is the same for all (softwood dissolving pulp, DP 1900, finely ground to the size of 0.3 mm). The table shows the quantities for dosing the chemicals (in relation to the dry weight of pulp alone) and the total water content calculated on the total mass of the mixture:

TABLE 3

Dosage ratios of example test runs with alkali metal hydroxide or hydrogen peroxide as auxiliary agent. The examples 8 to 11 are with the NaOH formulation and the examples 12 to 15 with the $H_2O_2$ formulation.

| Test No. | $H_2O_2$ % on pulp | NaOH % on pulp | Urea % on pulp | Water % in total mass |
|---|---|---|---|---|
| 8 | — | 7 | 72 | 24 |
| 9 | — | 7 | 72 | 24 |
| 10 | — | 7 | 72 | 24 |
| 11 | — | 9.2 | 91 | 26.1 |
| 12 | 10.8 | — | 72.0 | 25.8 |
| 13 | 7.0 | — | 42.0 | 21.3 |
| 14 | 3.8 | — | 30.8 | 24.0 |
| 15 | 3.0 | — | 30.0 | 20.4 |

After the working, the reaction is completed in an oven, in which T=135° C. and the retention time t=4 h, and finally the pulp is refined with a disc refiner. The properties of the cellulose carbamates thus obtained are presented in the following table 4.

TABLE 4

Analysis results of example test runs.

| Test No. | Degree of Polymerization DP | Clogging indicator Kw | Concentration of solution % | Ball viscosity S | Nitrogen N % | Degree of purity % | Quality of solution |
|---|---|---|---|---|---|---|---|
| 8 | 230 | 1900 | 5 | 12 | | | 1 |
| 9 | 700 | 6400 | | | | | 3 |
| 10 | 200 | 400 | 7 | 40 | | 69.7 | 1 |
| 11 | 160 | 553 | 2.5 | 51 | | 66.2 | 1 |
| 12 | 130 | 627 | 8 | 199 | 2.4 | 69.1 | 1 |
| 13 | 160 | 1489 | 7 | 58 | 2.5 | 79.6 | 1 |
| 14 | 400 | | 5 | 140 | 1.5 | 84.5 | 3 |
| 15 | 300 | 570 | 7 | 18 | | 82.6 | 1 |

The invention is not restricted to the examples of the above description, but it can be modified within the scope of the inventive idea presented in the claims.

The invention claimed is:

1. A method for manufacturing cellulose carbamate, comprising:
   providing a mixture including cellulose, a liquid, auxiliary agent, and urea, where the liquid content in the mixture is less than 40%; and
   subjecting the mixture where the liquid content is less than 40% to mechanical working, thereby enhancing absorption of the auxiliary agent and urea to the cellulose and at least partly performing a reaction between the cellulose and urea, wherein said mechanical working comprises compressing, rubbing, and stretching the mixture a plurality of times.

2. The method according to claim 1, wherein the auxiliary agent is an alkalizing agent.

3. The method according to claim 2, wherein the alkalizing agent is sodium hydroxide.

4. The method according to claim 1, wherein the auxiliary agent is hydrogen peroxide.

5. The method according to claim 1, wherein the mixture is subjected to the working between two surfaces moving in relation to each other.

6. The method according to claim 5, wherein in the working, the mixture is pressed through openings in one of the surfaces.

7. The method according to claim 6, wherein the working is performed in a sieve press.

8. The method according to claim 5, wherein the working is performed by running the mixture through a nip formed by two rolls.

9. The method according to claim 8, wherein the surface of at least one of the rolls is provided with a grooving.

10. The method according to claim 5, wherein the same mixture is recirculated several times between the two surfaces moving in relation to each other.

11. The method according to claim 1, wherein more than 50% of the liquid is water.

12. The method according to claim 11, wherein more than 70% of the liquid is water.

13. The method according to claim 11, wherein more than 90% of the liquid is water.

14. The method according to claim 11, wherein all of the liquid is water.

15. The method according to claim 1, wherein the auxiliary agent and an aqueous solution of urea are premixed into cellulose in such a way that the liquid substances are added in atomized form.

16. The method according to claim 15, wherein the premixing is performed in a fluidized bed mixer.

17. The method according to claim 1, wherein the processing time is less than 30 mm.

18. The method according to claim 17, wherein the processing time is less than 20 mm.

19. The method according to claim 17, wherein the processing time is less than 15 mm.

20. The method according to claim 17, wherein the processing time is less than 10 mm.

21. The method according to claim 1, wherein the cellulose is wood cellulose or dissolving pulp or cotton linters.

22. The method according to claim 1, wherein the cellulose is finely ground to a grain size of <2 mm.

23. The method according to claim 22, wherein the cellulose is ground to a grain size of less than 1 mm.

24. The method according to claim 22, wherein the cellulose is ground to a grain size of less than 0.7 mm.

25. The method according to claim 1, wherein during the working, the temperature of the mixture is adjusted by the circulation of an external heating or cooling medium.

26. The method according to claim 1, wherein the liquid content in the mixture is less than 30%.

27. The method according to claim 1, wherein the liquid content in the mixture is less than 25%.

28. The method according to claim 1, wherein the liquid content in the mixture is less than 22%.

29. The method according to claim 1, wherein the mixture is subjected to a mechanical working in such a way that the components of the mixture are subjected to working repeatedly.

30. The method according to claim 1, wherein the auxiliary agent, an aqueous solution of urea, and dry, powdery urea are premixed into cellulose in such a way that the liquid substances are added in atomized form.

31. The method according to claim 1, further comprising:
   transferring the mixture directly, without drying in an intermediate step, from the mechanical working to an oven to complete the reaction between the cellulose and urea.

* * * * *